United States Patent [19]
Danchine et al.

[11] Patent Number: 6,086,294
[45] Date of Patent: Jul. 11, 2000

[54] ROBOTIC DEFLASHING OF PLASTICS WITH CUTTER GUIDANCE

[75] Inventors: Denis Danchine, Clarkston; Laxmi P. Musumur, Auburn Hills, both of Mich.

[73] Assignee: FANUC Robotics North America Inc., Rochester Hills, Mich.

[21] Appl. No.: 09/272,442

[22] Filed: Mar. 19, 1999

[51] Int. Cl.$^7$ .................................................. B23C 3/12
[52] U.S. Cl. ............................ 409/132; 407/53; 409/138
[58] Field of Search .................................. 409/132, 136, 409/138, 139, 140; 407/53, 54, 57; 144/240, 241

[56] References Cited

U.S. PATENT DOCUMENTS

| | | |
|---|---|---|
| 4,168,730 | 9/1979 | Keller . |
| 4,227,837 | 10/1980 | Yodoshi . |
| 4,475,850 | 10/1984 | Penoza et al. . |
| 4,637,775 | 1/1987 | Kato ........................................ 409/138 |
| 4,784,540 | 11/1988 | Underhaug ............................ 409/138 |
| 4,963,059 | 10/1990 | Hiyama . |
| 5,013,195 | 5/1991 | Strazer . |
| 5,049,009 | 9/1991 | Beck et al. . |
| 5,137,098 | 8/1992 | Raffaelli . |
| 5,188,488 | 2/1993 | Nakayama et al. . |
| 5,201,619 | 4/1993 | Yodoshi . |
| 5,226,760 | 7/1993 | Nishimura . |
| 5,273,422 | 12/1993 | Quin . |
| 5,312,212 | 5/1994 | Naumec ................................... 409/138 |
| 5,348,462 | 9/1994 | Cohen et al. . |
| 5,626,444 | 5/1997 | Campian . |
| 5,647,700 | 7/1997 | Velepec . |
| 5,765,975 | 6/1998 | Hoffmann et al. ...................... 409/138 |
| 5,806,577 | 9/1998 | Durand . |

FOREIGN PATENT DOCUMENTS

| | | | |
|---|---|---|---|
| 3738619 | 6/1989 | Germany ................................ 409/138 |
| 107718 | 7/1982 | Japan ...................................... 409/138 |

*Primary Examiner*—Daniel W. Howell
*Attorney, Agent, or Firm*—Howard & Howard

[57] ABSTRACT

An integral cutting tool (10) for trimming a flash portion (12) from a peripheral edge (14) of a blow-molded plastic part (16). The cutting tool (10) has a main section (18) which has a circular cross-section. The cutting tool (10) also has a cutting tip (20) with a distal end (22) and cutting edges (24). Between the main section (18) and the cutting tip (20) is an intermediate contoured section (26) which has a smooth surface. The cutting edges (24) on the cutting tip (20) extend from the end (22) of the cutting tip (20) up to the smooth contoured section (26). The contoured section (26) engages the shape of the part (16) to position the cutting tip (20) relative to the part (16) during the cutting of the flash (12).

12 Claims, 3 Drawing Sheets

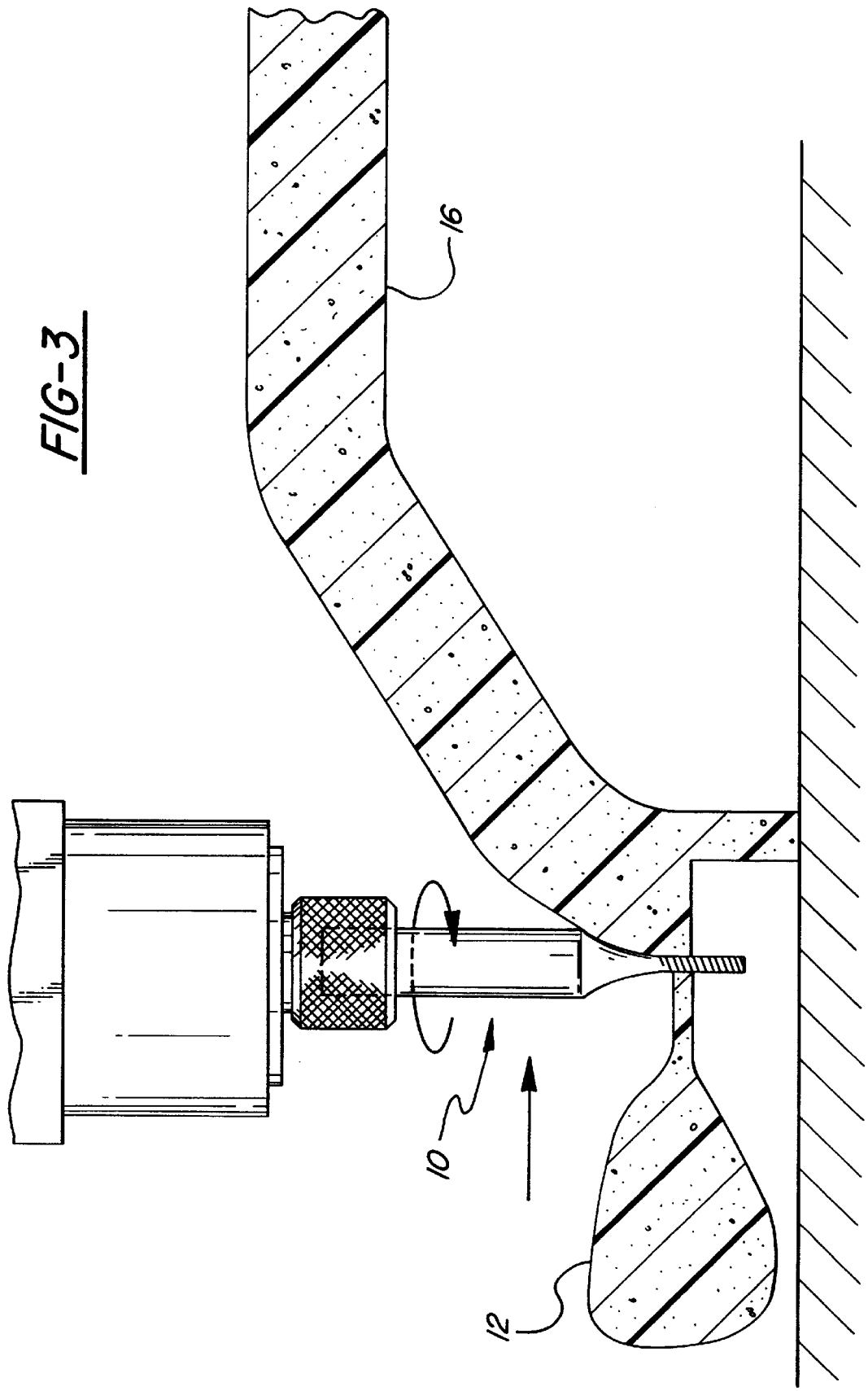

6,086,294

ROBOTIC DEFLASHING OF PLASTICS WITH CUTTER GUIDANCE

BACKGROUND OF THE INVENTION

1. Field of the Invention This invention relates to a cutting tool for trimming the flash from blow-molded plastic parts.

2. Description of the Prior Art

Removing flash from blow-molded plastic parts is a well known problem in the industry, and various methods have been developed to achieve removal of flash from blow-molded parts. The most common method of flash removal from blow-molded plastic parts is manual deflashing. This two stage process begins with a worker using a knife and/or a hammer to cut away the bulk of the flash known as "rough deflashing", followed by the worker using a scrapper to remove the remaining smaller pieces of flash and smooth the edges of the part known as "finish deflashing". This process is extremely labor intensive, and therefore expensive. Additionally, the use of sharp knives and scrappers by workers is hazardous to the workers themselves, and the associated injuries are costly to the manufacturer.

Another method incorporates the use of high-tech hardware and software to locate the parting line of the flash and then uses a tracking algorithm to guide a cutting tool along the parting line. These tracking algorithms are slow to react to changes in the part geometry, however, causing the cycle time for deflashing the part to be very long. Additionally, the complexity of the system and the inaccuracy of the sensors make a clean, accurate edge difficult to attain.

Finally, a third method of deflashing uses a cutting tool with a roller or bearing mounted to the tool which will ride along the part surface and guide the cutting of the tool. This set-up is difficult to control, however, as the roller or bearing rides along the part at some distance from the point the flash is being cut. This type of point contact between the tool and the part encourages the tool to bounce or jump at sharp edges or changes in part geometry. Also, since support is provided by a point contact between the tool and the part, there is no rotational support to insure that the tool is oriented accurately as it travels around the edge of the part.

SUMMARY OF THE INVENTION AND ADVANTAGES

A cutting tool for trimming a flash portion from a peripheral edge of a blow-molded plastic part. The cutting tool has a main section which has a circular cross-section and a cutting tip having a circular cross-section that is smaller than the cross-section of the main section. An intermediate contoured section extends between the main section and the cutting tip and includes a smooth surface which increases in circular cross-section from the cutting tip to the main section.

The present invention also provides a method for trimming flash from a blow-molded plastic part comprising the steps of positioning the cutting tip relative to the part by engaging the part with the contoured section of the cutting tool; and cutting flash from the part by rotating the cutting tip while moving the cutting tip along the periphery of the part.

Accordingly, the present invention will utilize a cutting tool which is guided by itself along the part. The contoured smooth surface of the intermediate section is used as a guide. The contoured smooth section conforms to the shape of the part giving a broad surface to support the tool. This broad support improves upon the point contact support that is provided by the cutting tool with a roller or bearing, and will also be cheaper because it is one integral piece. By supporting the tool with the smooth contoured surface, rotational stability of the tool is achieved, assuring that the cutting tip will travel the correct path along the parting line between the molded part and the flash and at the correct orientation. Additionally, by using the broad surface of the intermediate contoured section for support, the tool can be guided by the part surface alone. No software or algorithms are necessary to guide the tool. This will promote faster cutting speeds because the tool path will not need to be re-calculated each time there is a slight geometry change in the part that is being trimmed. More efficient flash removal will be achieved as the tool will be guided by each part individually so the tool will conform to slight differences from part to part with no loss of time or accuracy. The process is completely automated, so there is very little manual labor or risk of injury. The present invention removes the flash from a blow-molded plastic part in a quick, efficient manner, that is both safe and productive.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an elevational view of the cutting tool in working engagement with the part as the flash is being trimmed.

DETAILED DESCRIPTION OF THE PREFERRED EMBODIMENT

Figure 1:
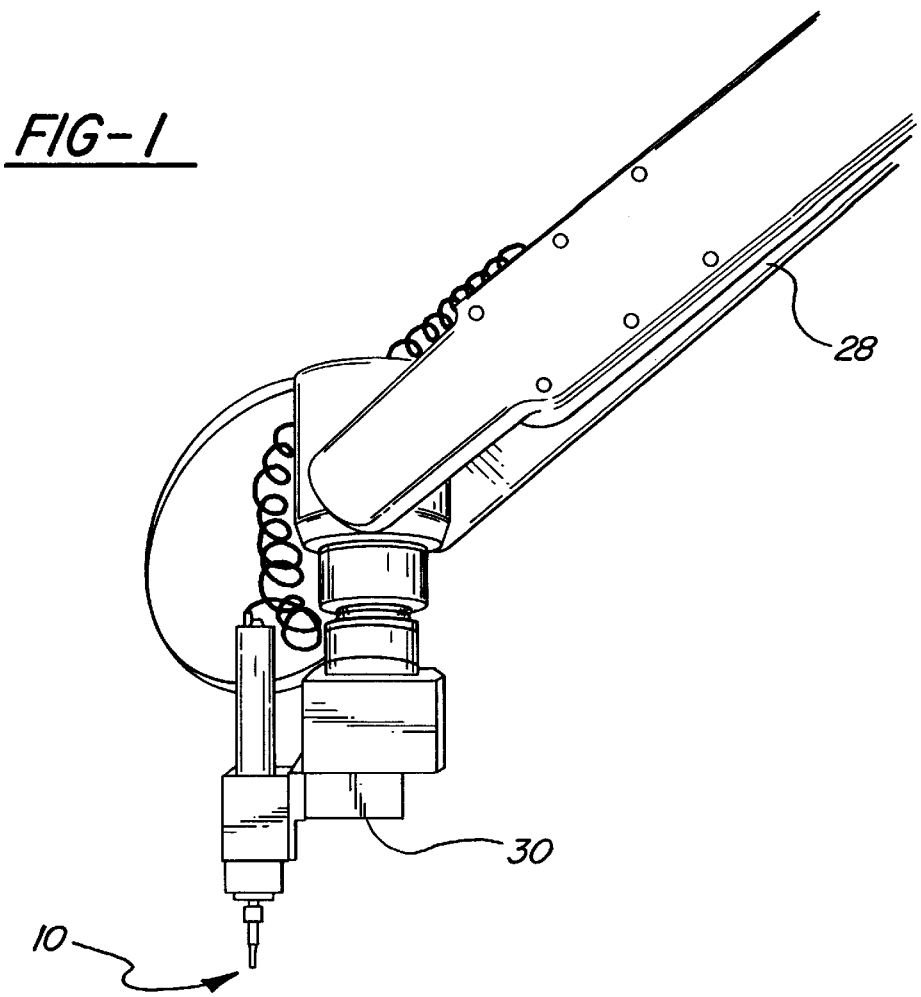
FIG. 1 is a view of the prototype workstation with the part setting on a table and the cutting tool mounted to a robotic arm above the part prior to engagement.
Figure 1:
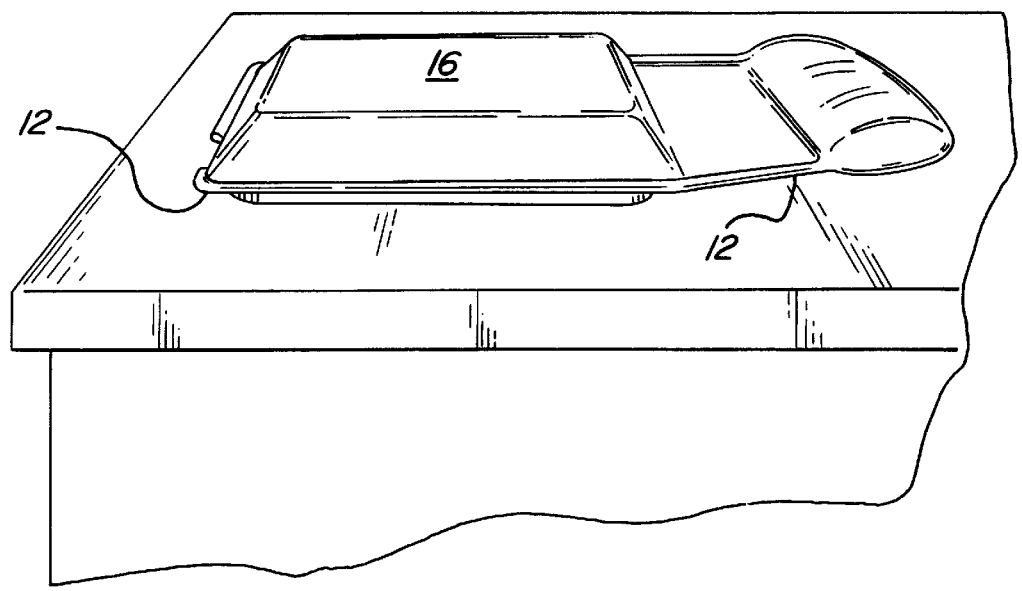
Figure 2:
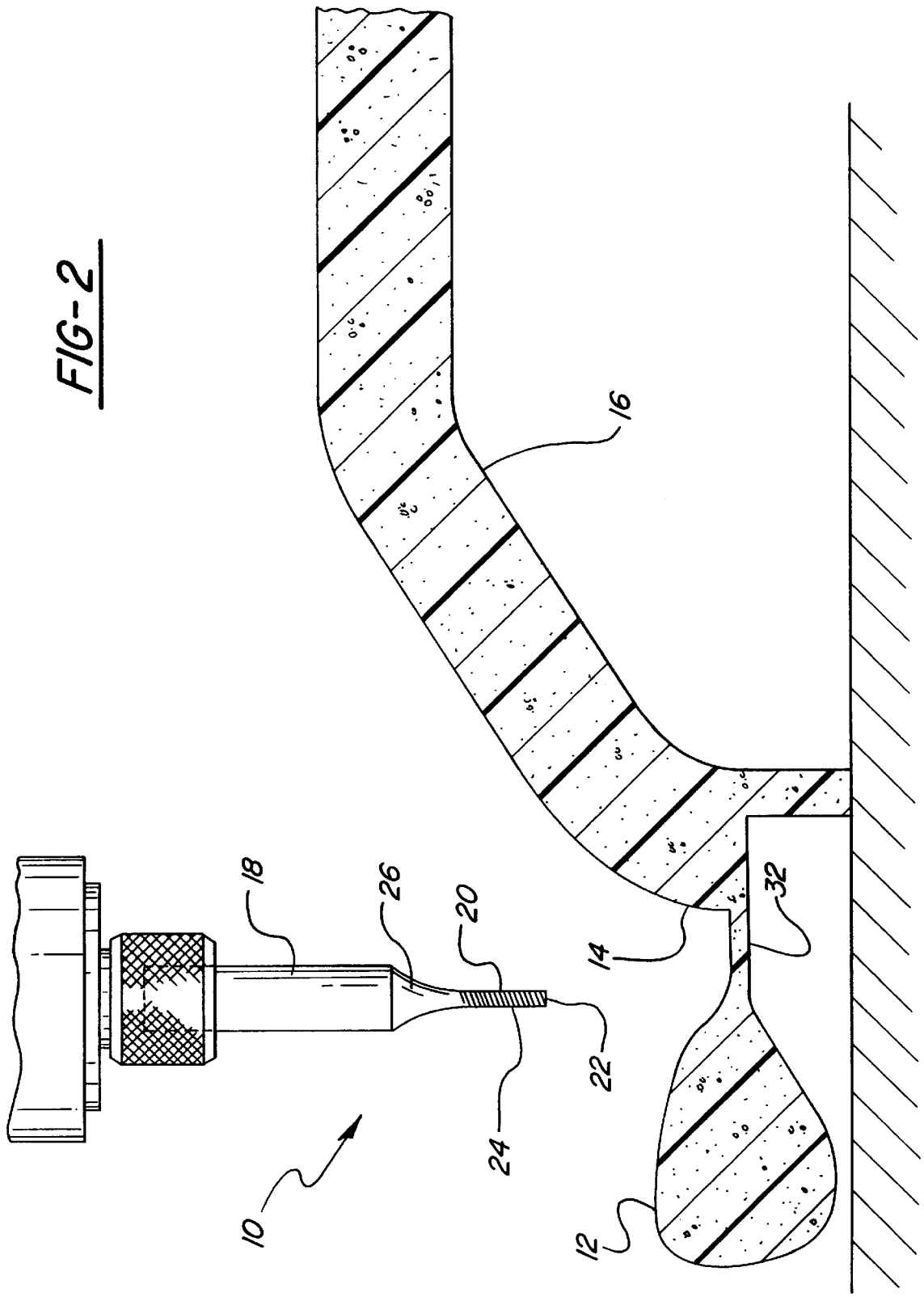
FIG. 2 is an elevational view of the cutting tool prior to engagement with the part.

Referring to the Figures, wherein like numerals indicate like or corresponding parts throughout the several views, an integral cutting tool is generally shown at 10 for trimming a flash portion 12 from a peripheral edge 14 of a blow-molded plastic part 16. The cutting tool 10 has a main section 18 which has a circular cross section. The cutting tool 10 also has a cutting tip 20 with a distal end 22 and cutting edges 24. The cutting tip 20 has a cross section that is smaller than the cross-section of the main section 18. Between the main section 18 and the cutting tip 20 is an intermediate contoured section 26 which has a smooth surface and has a cross-sectional area that increases from the cutting tip 20 towards the main section 18. The cutting edges 24 on the cutting tip 20 extend from the distal end 22 of the cutting tip 20 up to the smooth contoured section 26.

A robotic arm is generally shown at 28. The cutting tool 10 is mounted to the robotic arm 28 which is used to manipulate the cutting tool 10 along the edge 14 of the part 16. The robotic arm 28 is also equipped with a compliance device 30 for providing a constant force between the cutting tool 10 and the peripheral edge 14 of the part 16. The robotic arm 28 may also include a cooling unit 34 for providing a current of air or coolant directed onto the cutting tool 10 to remove the heat that is generated by friction between the tool 10 and the part 16 during the cutting operation. The removal of this heat will help to insure part quality and longer tool life.

In operation, the cutting tool 10 is rotated as the robotic arm 28 brings the cutting tool 10 into engagement with the part 16. The rotating smooth contoured section 26 contacts the part 16 and positions the cutting tip 20 relative to the part 16 while the flash portion 12 is cut away by the cutting tip 20. Preferably, the cutting tip is positioned to cut away the flash along the parting line 32 between the molded part and the flash. As the robotic arm 28 manipulates the cutting tool 10 along the edge 14 of the part 16, constant force is maintained between the cutting tool 10 and the part 16 to insure consistent trimming of the flash 12 around the entire peripheral edge 14 of the part.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A cutting tool (10) for trimming a flash portion (12) from a peripheral edge (14) of a blow-molded plastic part (16) comprising;
    a main section (18) having a first cross section;
    a cutting tip (20) having a second cross section and including cutting edges (24); and
    an intermediate contoured section (26) extending between said main section (18) and said cutting tip (20), said contoured section (26) presenting a smooth surface adapted to engage and guide said tool (10) along the peripheral edge (14) of the blow-molded plastic part (16).

2. The cutting tool as set forth in claim 1 wherein said first and second cross sections are circular.

3. The cutting tool (10) as set forth in claim 1 wherein said contoured section (26) increases in circular cross section from said cutting tip (20) to said main section (18).

4. The cutting tool (10) as set forth in claim 1 wherein said contoured section (26) has substantially the same cross sectional area as said cutting tip (20) and said main section (18).

5. The cutting tool (10) as set forth in claim 1 wherein said cutting tip (20) includes a distal end (22) and said cutting edges (24) extend from said distal end (22) to said smooth contoured section (26).

6. The cutting tool (10) as set forth in claim 5 wherein said cutting tool (10) is mounted to a robotic arm (28), said robotic arm (28) adapted to manipulate said cutting tool (10) along the peripheral edge (14) of the blow-molded plastic part (16).

7. The cutting tool (10) as set forth in claim 6 wherein said robotic arm (28) is equipped with a compliance device (30) for providing a constant force between said cutting tool (10) and the peripheral edge (14) of the blow-molded plastic part (16).

8. The cutting tool (10) as set forth in claim 6 wherein said robotic arm (28) includes a spot cooling unit (34) mounted to the robotic arm (28) to direct coolant on said cutting tool.

9. A method for trimming flash (12) from a blow-molded plastic part (16) by using a cutting tool (10) having a main section (18) and a cutting tip (20) with an intermediate contoured section (26) between the main section (18) and the cutting tip (20) and contoured to the shape of the part (16) adjacent the flash (12);
    said method comprising the steps of:
        rotatably engaging the shape of the part (16) with the contoured section (26) to position the cutting tip (20) relative to the part (16), and
        cutting flash (12) from the part (16) by rotating the cutting tip (20) while moving the contoured section (26) along the peripheral edge (14) of the part (16).

10. The method set forth in claim 9 including using a robotic arm (28) for moving the cutting tool (10) along the peripheral edge (14) of the blow-molded plastic part (16).

11. The method set forth in claim 9 including maintaining a constant force between said cutting tool (10) and said peripheral edge (14) of said blow-molded plastic part (16).

12. The method as set forth in claim 9 including directing a coolant onto said cutting tool (10).

* * * * *